United States Patent
Fan et al.

(10) Patent No.: US 10,752,386 B1
(45) Date of Patent: Aug. 25, 2020

(54) FLEXIBLE ABLATOR FOR THERMAL PROTECTION

(71) Applicant: USA as Represented by the Administrator of the National Aeronautics and Space Administration, Washington, DC (US)

(72) Inventors: Wenhong Fan, Cupertino, CA (US); Robin A. Beck, San Jose, CA (US); Jeremy J. Thornton, Gardena, CA (US); Susan M. White, Sunnyvale, CA (US); James O. Arnold, Saratoga, CA (US)

(73) Assignee: United States of America as Represented by the Administrator of the NASA, Washington, DC (US)

(*) Notice: Subject to any disclaimer, the term of this patent is extended or adjusted under 35 U.S.C. 154(b) by 360 days.

(21) Appl. No.: 15/382,404

(22) Filed: Dec. 16, 2016

Related U.S. Application Data

(62) Division of application No. 13/659,739, filed on Oct. 24, 2012, now abandoned.

(60) Provisional application No. 61/550,848, filed on Oct. 24, 2011.

(51) Int. Cl.
*B05D 5/00* (2006.01)
*B64G 1/58* (2006.01)
*B05D 1/18* (2006.01)
*B05D 3/10* (2006.01)

(52) U.S. Cl.
CPC ............... *B64G 1/58* (2013.01); *B05D 1/18* (2013.01); *B05D 3/108* (2013.01)

(58) Field of Classification Search
CPC ........ B05D 3/0281; B05D 3/108; B05D 5/00; B05D 7/02; B05D 7/16
See application file for complete search history.

(56) References Cited

U.S. PATENT DOCUMENTS

| | | | | |
|---|---|---|---|---|
| 5,536,562 A * | 7/1996 | Tran | .......................... | B64G 1/58 244/121 |
| 5,672,389 A * | 9/1997 | Tran | .......................... | B64G 1/58 427/294 |
| 6,955,853 B1 * | 10/2005 | Tran | .......................... | B32B 18/00 428/220 |
| 7,931,962 B1 * | 4/2011 | Willcockson | .......................... | B64G 1/58 244/159.1 |

* cited by examiner

*Primary Examiner* — Hai Y Zhang
(74) *Attorney, Agent, or Firm* — Meredith K. Blasingame; Robert M. Padilla

(57) ABSTRACT

Methods for producing a flexible, fibrous ablator thermal protection material, for use in association with a space vehicle that passes through an atmosphere in which severe heating is experienced. A phenolic resin and/or a silicone resin can be used. The elastic modulus of the resulting material is low, in a preferred range of about 200-5000 kPa, and can be controlled by choice of a curing temperature and/or a time interval length for curing.

9 Claims, 6 Drawing Sheets

FLEXIBLE ABLATOR FOR THERMAL PROTECTION

CROSS-REFERENCE TO RELATED APPLICATION

This application is a divisional of U.S. patent application Ser. No. 13/659,739, filed Oct. 24, 2012. U.S. patent application Ser. No. 13/659,739 claims the benefit of U.S. Provisional Application No. 61/550,848, filed Oct. 24, 2011. The contents of U.S. patent application Ser. No. 13/659,739 and U.S. Provisional Application No. 61/550,848 are hereby incorporated in their entirety.

ORIGIN OF THE INVENTION

The invention described herein was made by an employee(s) of the United States Government and may be manufactured and used by or for the Government of the United States of America for governmental purposes without the payment of any royalties thereon or therefor.

FIELD OF THE INVENTION

This invention relates to production and use of a flexible ablator as a thermal protection system (TPS) material for extreme thermal environments, with temperatures 1000° F. or above and for heat shield deployment after launch or near the target. Atmospheric density associated with a planet can differ by orders of magnitude between planets, as illustrated in FIG. 1, which compares Earth and Mars.

BACKGROUND OF THE INVENTION

An ablative heatshield, as presently formulated for atmospheric entry or re-entry by a space vehicle, is often a rigid structure and, for some missions, requires that the structure be easily packaged, stowed and deployed when that stage of the space vehicle is launched. This is often inconvenient. Use of larger deployable aerodynamic decelerators will allow for heavier payloads to be delivered, but still launched in available systems.

An existing flexible TPS material, such as AFRSI (advanced flexible refractory silicon insulation) cannot survive the heating rates required for a hypersonic inflatable aerodynamic decelerator (HIAD). Existing, rigid TPS material is inflexible and cannot be stowed and deployed for the HIADs.

An existing, rigid TPS material is often difficult to use in the design of a rigid entry vehicle. For example, PICA is not used on the Orion vehicle because of thermo-structural issues when the vehicle serves as a system with the TPS carrier structure. A flexible, ablative TPS, produced according to the invention, would not present this issue because the material is compliant.

Huy Tran et al, in "Silicone Impregnated Reusable Ceramic Ablators For MARS Follow-on Missions," AIAA Meeting Paper No. 96-1819 (New Orleans Jun. 17-20, 1996), have discussed several thermal characterization experiments performed on different formulations of a thermal ablator material, silicone impregnated reusable ceramic ablators ("SIRCA"), under conditions that approximate the conditions anticipated for a Mars surface landing. Among other observations, the authors found that the formulations of SIRCA characteristically belong to one of three regimes: (i) a first regime, associated with heat flux densities below 150 Watts/cm', where the SIRCA surface does not recede or undergo phase transformation; (ii) a second regime, associated with heat flux densities in a range of 150-270 Watts/cm', where the surface does not recede but some of the interior material undergoes a phase change, which appears on or near the surface; and (iii) a third regime, associated with flux densities greater than 270 Watts/cm', where surface recession and mass loss occur. SIRCA, like PICA, is rigid and requires a tile-like manufacturing and assembly approach in order to enable missions that use large area heatshieds. SIRCA also cannot meet the requirement of a deployable heatshield.

What is needed is a flexible, ablative TPS material that can be deployed in flight near the target to form a large, blunt shape, conformable to a vehicle shape and providing aerodynamic drag during hypervelocity atmospheric flight, without perishing from heating from the bow shock wave that envelops the body. Also needed is a compliant TPS material that is easily to manufacture and attach to space vehicles, that is unaffected by deflections, by differences in thermal expansion, or by contraction of the other material, and that is suitable for use on windward and/or leeward surfaces of conventional robotic and re-entering space vehicles. The material should be capable of withstanding heat fluxes in the range of 40-270 Watts/cm'. Conventional TPS materials are unlikely to satisfy all these needs.

SUMMARY OF THE INVENTION

The invention provides several methods for producing a flexible ablator having controllable elastic modulus and controllable flexibility, which varies with one or more of the processing parameters used to produce the material. The invention provides a family of low density, flexible ablators comprising of a flexible fibrous substrate and a polymer resin. The fibers in the substrate preferably have diameters of about 5-40 μm.

A first objective of this invention is to provide a class of low density, flexible ablators that can be fabricated into heat shields capable of being packaged, stowed and later deployed in space. A second objective is to provide a class of low density, flexible or conformable ablators that can be used as heat shields for easy and economic attachment onto the exterior of spacecrafts. A third objective is to provide a class of low density ablators with large porosity that facilitates the blowing of gas molecules and provides good thermal insulation (low thermal conductivity).

A fourth objective of this invention is to provide a class of low density, flexible ablators with high thermal oxidation resistance, where the heat shields can withstand entry conditions that are rich in oxygen species, such as the atmospheres of Mars and Earth. A fifth objective is to provide a class of low density ablators capable of passive transpiration under heated entry environment. A sixth objective is to provide a class of low density ablators that can withstand moderate to high heating environments (such as heat fluxes in a range of 40-500 Watts/cm') and can provide sufficient thermal protection for a spacecraft.

A seventh objective is to provide a class of low density, flexible ablative materials with polymer resin uniformly distributed in the fibrous substrate. An eighth object is to provide a class of low density, flexible ablators with polymer resin distributed with a density gradient, measured through the substrate thickness, in the fibrous substrate.

The goals of the work are primarily twofold: (i) to develop flexible, ablative TPS material that can be deployed to form a large, blunt shape body, referred to as a hypersonic inflatable aerodynamic decelerator (HIAD), which provides aerodynamic drag during hypervelocity atmospheric entry or re-entry, without perishing from heating by the bow shock wave that envelopes the body; and (ii) to provide a relatively inexpensive TPS material that can be bonded to a substrate, that is unaffected by deflections, by differences in thermal expansion or by contraction of a TPS shield, and that is suitable for windward and leeward surfaces of conventional robotic and human entry vehicles that would otherwise employ a rigid TPS shield.

One application of a HIAD is delivery of a large payload (e.g., 40 metric tons) to a surface of Mars. Another application, on a rigid re-entry vehicle, is on an upper nose and leeward aft-body similar to the medium lift over drag (L/D) Mars human exploration vehicle.

A flexible ablative TPS material can be stowed in the shroud of a launch vehicle and deployed in space, without compromising the TPS functionality. A flexible, ablative TPS can perform at heating rates far above the capability of current state-of-the art flexible TPS, such as the Space Shuttle Advanced Flexible Reusable Surface Insulation (AFRSI). Recent experiments indicate that flexible ablators typically can function up to 115 Watts/cm$^2$ for silica-based embodiments, and at greater than 400 Watts/cm$^2$ for carbon-based embodiments. A flexible, ablative TPS material is capable of dual heat pulse operation as required for aero-capture into Mars orbit, which includes cool down subsequent to capture in orbit, and re-use for out-of-orbit entry to deliver large payloads to a planet's surface.

This invention provides a family of lightweight, flexible and conformable ablative materials that are capable of forming structurally stable chars after exposure to a high heating environment (2000° F. and above). Prototype samples of this invention have been tested in aero-convective and/or constant environments that include X-jet, LHMEL (Laser hardened materials evaluation laboratory), and ArcJet. At heat fluxes in a range 100-150 Watts/cm$^2$ and at a stagnation pressure of 0.16 atm, the carbon and ceramic felt reinforced silicone ablators have similar or better ablation performance than SIRCA at comparable areal density.

The inventors further discovered that, by increasing the resin loading and utilizing carbon felt reinforcements, the flexible ablative materials become efficient in providing adequate thermal protection in heat fluxes above 150 W/cm$^2$, expanding the heat ranges up to 540 W/cm$^2$, as Arc jet data showed that around that heat flux and the pressure around 0.35 atm, the performance of the flexible ablative materials of this invention have lower bondline temperature than PICA at comparable thickness and/or areal density, with recession approaching that of PICA.

The inventors also discovered that the flexible ablators perform well when exposed to tandem heat pulses. LHMEL tests, which subject the materials to a sequence of heat fluxes at 115 Watts/cm$^2$ for 30 sec, followed by a lower heat flux of 30 Watts/cm$^2$ for 100 sec, reveal that the carbon silicone has a lower backface temperature than its rigid counterpart using SIRCA. This indicates that flexible ablators are good candidates for Mars missions, as the EDL (entry, descent and landing) mission includes at least two stages, aero-capture into Mars orbit and entry from the orbit.

DESCRIPTION OF THE INVENTION

The preceding objectives can be achieved, in a first embodiment of a flexible ablator, by a method that comprises (1) immersing a flexible, fibrous substrate in a diluted polymer resin solution and (2) removing the solvent, with or without curing the polymer resin. The polymer is primarily responsible for ablation, and the fibrous substrate provides structural reinforcement.

Use of a silicone matrix provides thermal stability, thermal oxidization resistance and flexibility; some of the undesirable aspects of a silicone matrix include inefficient ablation (less endothermic decomposition and less pyrolysis gas produced compared with phenolic based ablators), brittleness of char and low mechanical strength.

Use of a ceramic/silica felt as fibrous substrate provides advantages of high char yield, non-oxidization and low thermal conductivity; disadvantages of use of a ceramic/silica felt include low structural benefit and melting at high temperatures. Heat fluxes up to 130 Watts/cm$^2$ can be accommodated.

Use of a polymer felt as fibrous substrate provides advantages of toughness and flexibility; disadvantages of use of a polymer felt include low char yield, ease of material oxidization and material shrinkage. Heat fluxes up to 200 Watts/cm$^2$ can be accommodated.

Use of a carbon felt as fibrous substrate provides advantages of high temperature stability, high char yield and robustness in heating environments up to at least 500 Watts/cm$^2$; disadvantages of use of a carbon felt include ease of material oxidization and high thermal conductivity. For higher heat fluxes, replacement of silicone resin with a phenolic resin provides a more efficient flexible ablator.

Figure 1:
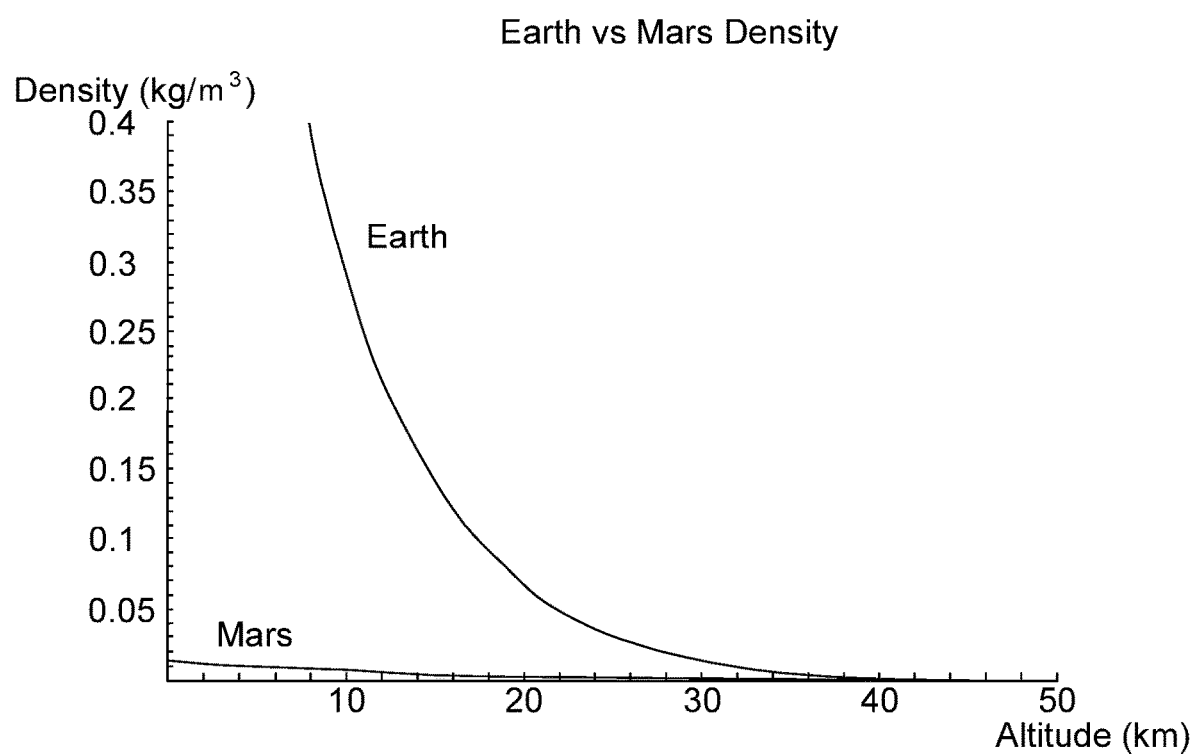
FIG. 1 graphically compares variation of atmospheric density of the Earth and Mars versus altitude.
Figure 2:
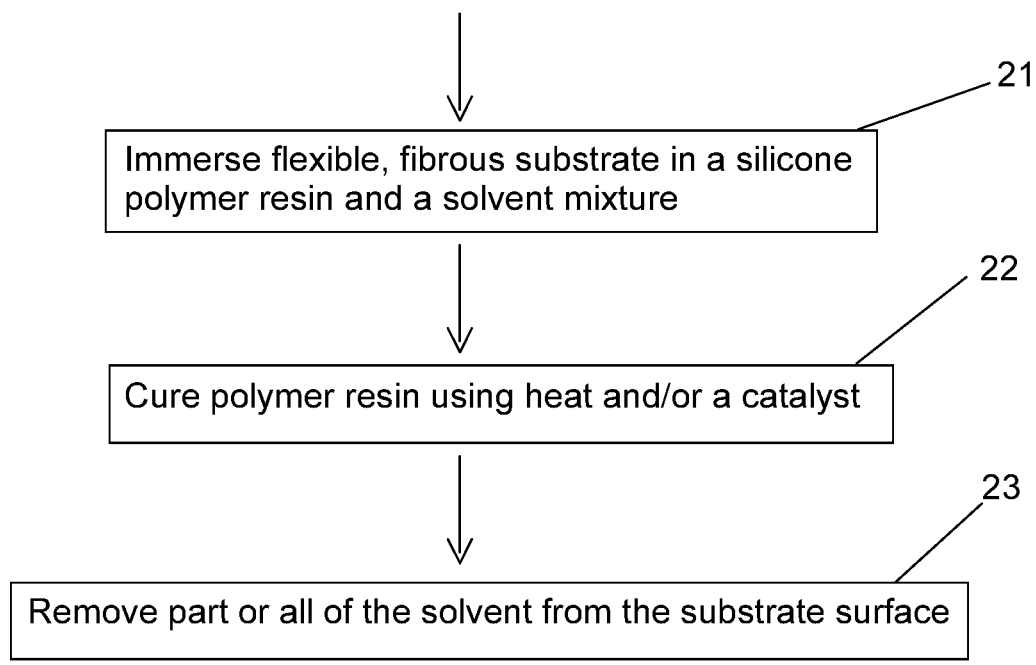
FIGS. 2, 3, 4 and 5 are flow charts of procedures that can be used to produce a flexible ablator according to different embodiments of the invention.

FIG. 2 is a flow chart of a first embodiment for practicing the invention. In step 21, a flexible, fibrous substrate (e.g., with carbon-based or silica-based fibers of diameters 5-40 μm) is immersed in a silicone resin and a solvent mixture (e.g., toluene, butanol or another suitable solvent). In step 22, the silicone resin is cured, using heat or a catalyst. In step 23, part or all of the solvent mixture is removed from the surfaces of the substrate. This produces a flexible, ablative, thermal protection material having an elastic modulus value no more than about 5,000 kPa.

Figure 3:
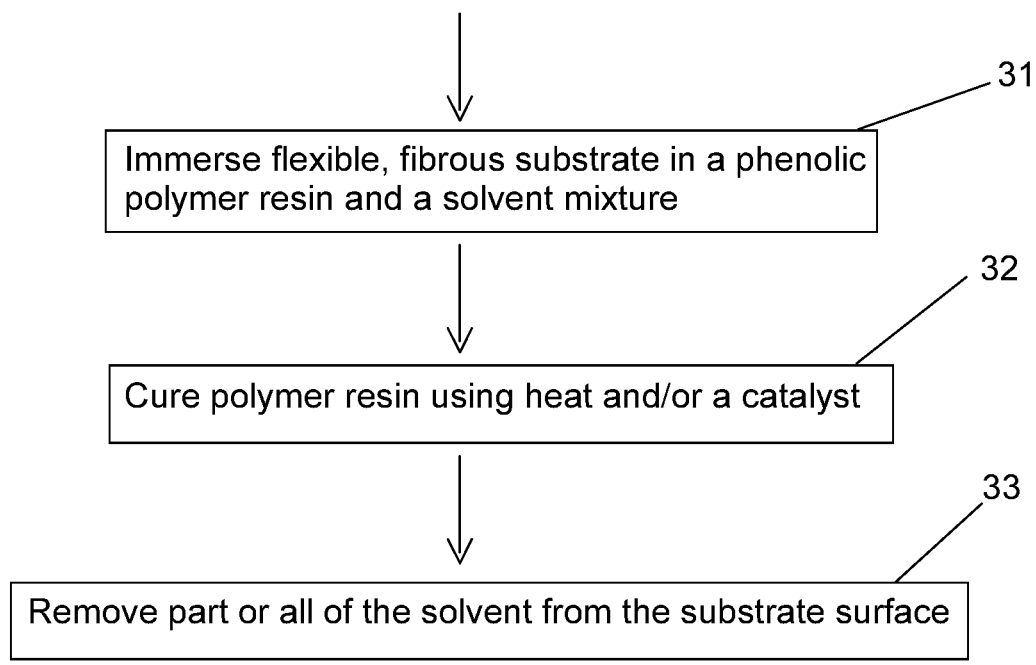

FIG. 3 is a flow chart of a second embodiment of the invention. In step 31, a flexible, fibrous substrate (e.g., with carbon-based or silica-based fibers of diameters 5-40 μm) is immersed in a phenolic resin and a solvent mixture (e.g., ethylene glycol, alcohol, or another suitable solvent). In step 32, the phenolic resin is cured, using heat or a catalyst. In step 33, part or all of the solvent mixture is removed from the surfaces of the substrate. This produces a flexible, ablative, thermal protection material having an elastic modulus value no more than about 5,000 kPa.

Figure 4:
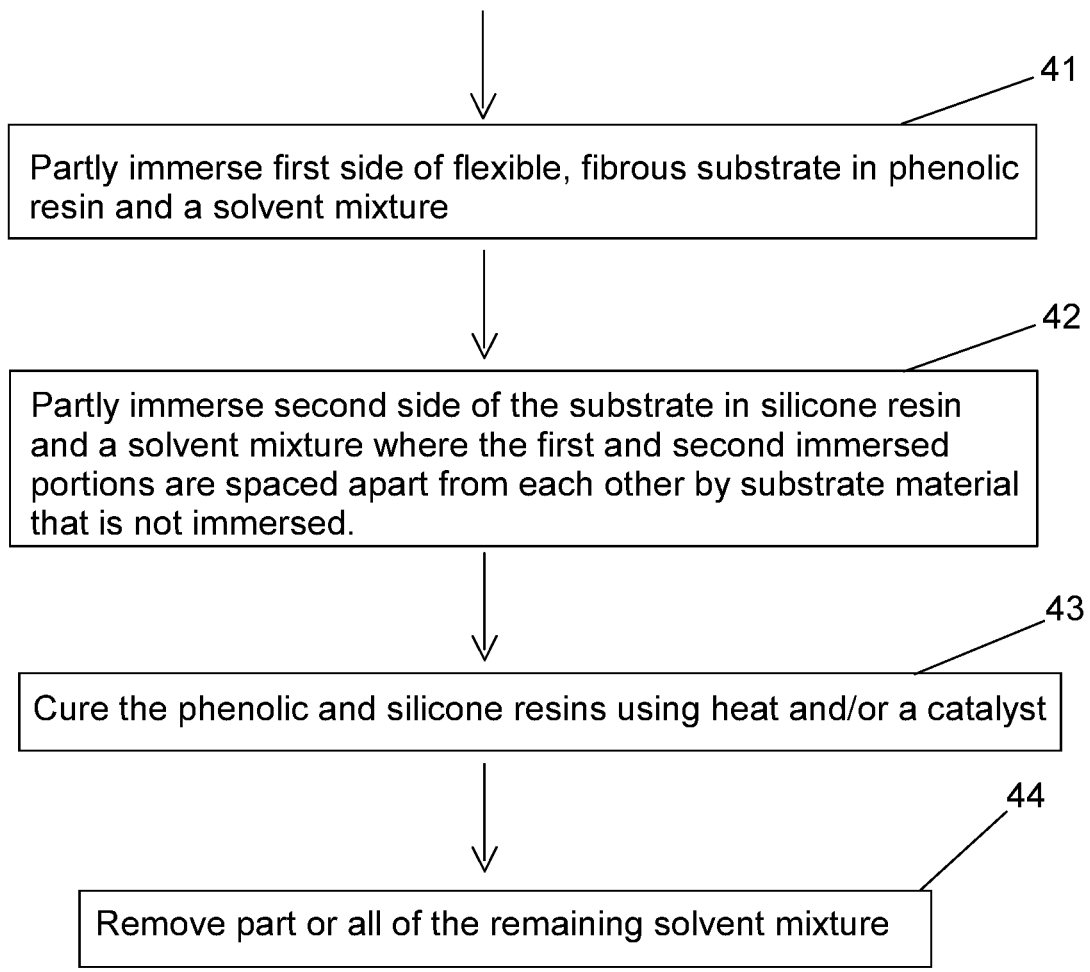
Figure 5:
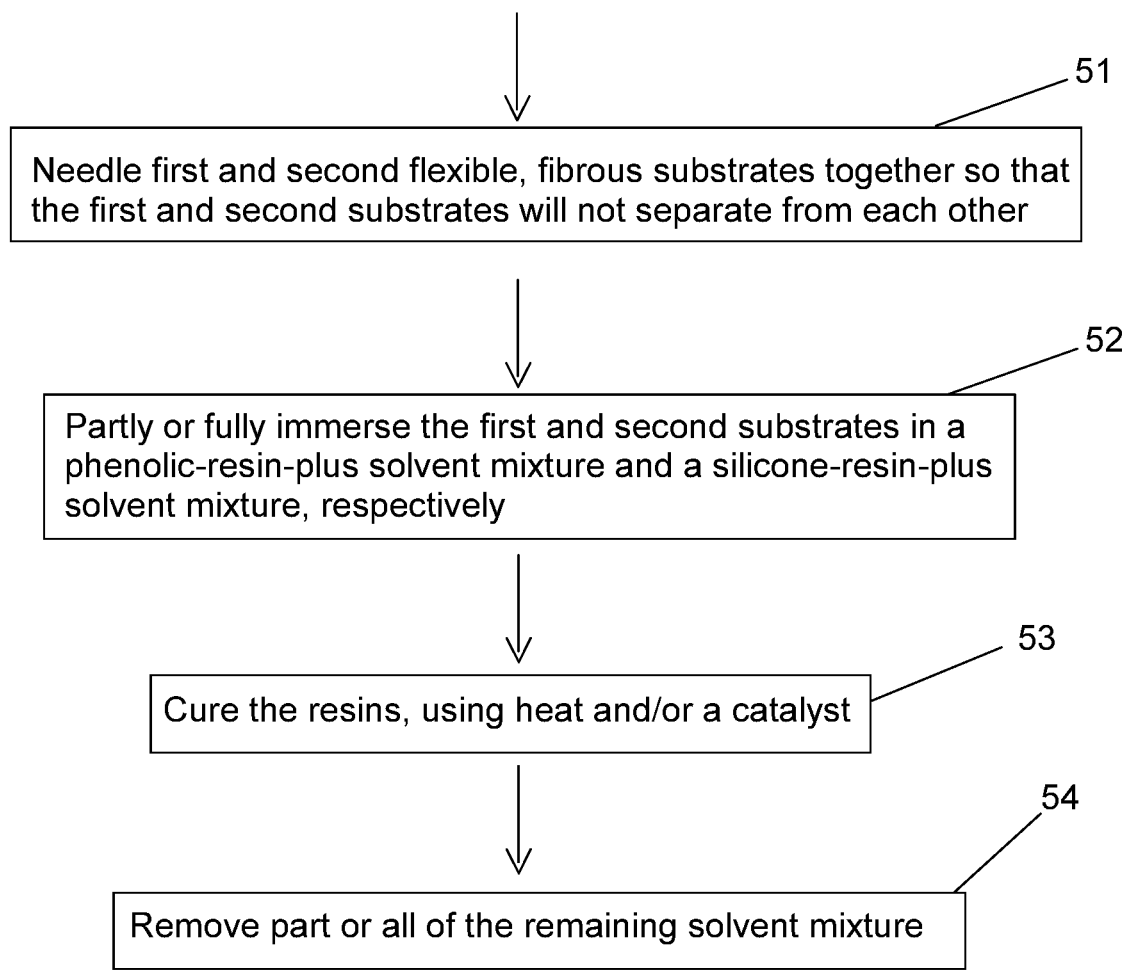

FIG. 4 is a flow chart of a third embodiment. In step 41, a first side of a flexible, fibrous substrate (e.g., with carbon-based or silica-based fibers of diameters 5-40 μm) is partly immersed in a phenolic resin and a suitable solvent mixture (e.g., ethylene glycol, alcohol). In step 42, a second side of the substrate is partly immersed in a different resin (e.g., silicone resin) in a suitable solvent mixture. The immersed portions of the substrate should be spaced apart from each other by substrate material that is not immersed. In step 43, the resins are cured, using heat and/or a catalyst. In step 44, part or all of the remaining solvent mixture is removed. This produces a flexible, ablative, thermal protection material having an elastic modulus value no more than about 5,000 kPa. The substrate assembly is positioned so that the first substrate side is exposed to the heating source with the highest temperature (e.g., re-entry temperatures), and the second substrate side is contacted with a surface that will experience much lower temperatures (e.g., several hundred degrees Celsius lower).

In a fourth embodiment (step 51), first and second flexible, fibrous substrates are joined by "needling" a surface of each of the two substrates together so that these substrates will not separate from each other. The fibers are carbon-based or silica-based. In step 52, the first and second substrates are partly or fully immersed in a phenolic resin and in a silicone resin, respectively, or optionally in the same phenolic or silicone resin. In step 53, the resins are cured, using heat and/or a catalyst. In step 54, part or all of the remaining solvent mixture is removed. This produces a flexible, ablative, thermal protection material having an elastic modulus value no more than about 5,000 kPa. The substrate assembly is positioned so that the first substrate side is exposed to the heating source with the highest temperature (e.g., re-entry temperatures), and the second substrate side is contacted with a surface that will experience much lower temperatures (e.g., a few hundred degrees Celsius lower).

In a fifth embodiment, the polymer resin and solvent mixture are sprayed or otherwise deposited onto a substrate (e.g., ceramic of carbon felt or a flexible rod ablator) that is bonded to a heat shield surface, preferably with a thickness in a range 10 μm-100 mm, and allowed to diffuse into the heat shield material. The material is cured, using heat and/or a catalyst, and the remaining solvent mixture is cured. This produces a flexible, ablative, thermal protection material having an elastic modulus value no more than about 5,000 kPa.

A flexible, fibrous substrate is un-rigidized and may have a low compression modulus, as low as about 200 kPa. Ideally, a desirable fibrous substrate should have high temperature capability, thermal stability and high char yield. The density of the fibrous substrate is preferably in a range 0.08-0.35 g/cm$^3$. The thickness of the fibrous substrate is preferably in a range 1-8 cm, and fiber diameters are preferably in a range 5-40 μm.

Examples of the fibrous substrates can include various woven, stitched or loosely packed carbon, polymer and ceramic felts.

Examples of ceramic felts include the felts based on high purity silica, such as the insulation blankets used on shuttles, for example, Q-felts, AFRSI, REFRSIL, or high purity silica aluminates such as Dura-Blanket™. Examples of carbon felts include both Morgan™ or FMI™ felts. Polymer felts are limited to polymers with high temperature stability and high char yields such as PBI™ and Nomex™. Alternatively, two different felts can be stitched together to form one pre-form, with one of the felts being coated with a polymer resin to form the ablative layer, and the other felt serving as an insulation layer. An example of stitched felt is a top layer of silica felt and a bottom layer of PBI/PBO felt (polybenzamidazole/polybenzoxazole), the thickness of silica felt and PBI/PBO are preferably between 0.5-2" and 0.125-0.5", respectively.

A particularly attractive example of stitched felt is carbon felt over polymer felt, such as carbon- and PBI stitched/needled together, where carbon serves as a top layer to provide the high temperature capability, and PBI serves as a bottom layer to enhance insulation and lower bondline temperature The thickness of carbon felt and PBI/PBO are preferably between 0.5-2" and 0.125-0.5", respectively.

The polymer resin supports ablation and transpirational cooling. The resin can be chosen from thermosetting resins or from thermoplastic polymers. Alternatively, a thermoplastic polymer can be added to a thermoset resin and the two resins can be cured together. Examples of thermoset resins include, but are not limited to, phenolic, silicone, polyimide and epoxy resins. Examples of thermoplastic polymers include, but are not limited to, polyisoprene (rubber) and polyethylene.

A first novel feature of this invention is that it provides flexible ablators that can withstand a wide range of heating rates (40-540 Watts/cm$^2$) with the upper limit of survivable heat flux being comparable to the survivable heat flux for rigid ablators, such as PICA and Avcoat. The amount and composition of polymer resin can be readily tailored to specific mission requirements.

A second novel feature of this invention is the material's potential to provide simple and versatile manufacturing methods to produce large area heat shields via a monolithic approach, which provides a heat shield material with fewer seams or gaps.

Materials and Characterization

Substrates used for this project include a series of flexible insulation felts such as ceramic felt (silica or silica aluminate), PBI felt, and carbon felt (Morgan and FMI®). The ceramic felts also include Durablanket (silica aluminosilicate, which melts at T≈1760° C.), Q-felt (quartz, pure silica) and REFRSIL (less pure silica with a melting point lower than that of Q-felt). Durablanket and Q-Felt contain loosely connected short fibers, while REFRSIL is a woven blanket that is mechanically more robust but is also more rigid. Silicone resin 655A and 655B are produced by GE Silicones and distributed by Momentive.

Scanning Electron Microscope (SEM). An XL30 environmental SEM (offered by FEI, Hillsboro, Oreg.) was used to characterize the morphology of the flexible ablator specimens in low vacuum (wet) mode to prevent surface charging of the polymeric material. The specimens were imaged under the same magnification lens, to facilitate a qualitative comparison.

Thermogravimetric Analysis (TGA): TGA under argon was conducted on a Netzsch (model number STA 409PC) with a flow rate of argon at 20 ml/min. and a heating rate of 20° C./min.

X-Jet Test:

An X-Jet provides an electrical arc between two electrodes to increase test gas enthalpy and to create a convective heating environment. A limitation of this test system is that the X-Jet uses a nozzle with a maximum size of 2.4 mm, which generates a maximum heating spot on the test article of diameter 12 mm, which results in a non-uniform heating environment for the relatively larger samples. Typical sample size is greater than 25 mm in diameter. The heat fluxes used for this test series were in a range 111-138 Watt/cm$^2$ and the pressure was 0.116 atm, with exposure time of 20 seconds. Samples were cut into 5 cm by 5 cm squares and bonded on FRCI tile holders. The thickness of the holder was 12 mm and the backside of the holder was instrumented with a thermocouple (type K) that measures the backface (or bondline) temperature of the sample. For each material at each condition, only one model was tested.

ArcJet Test.

Figure 6:
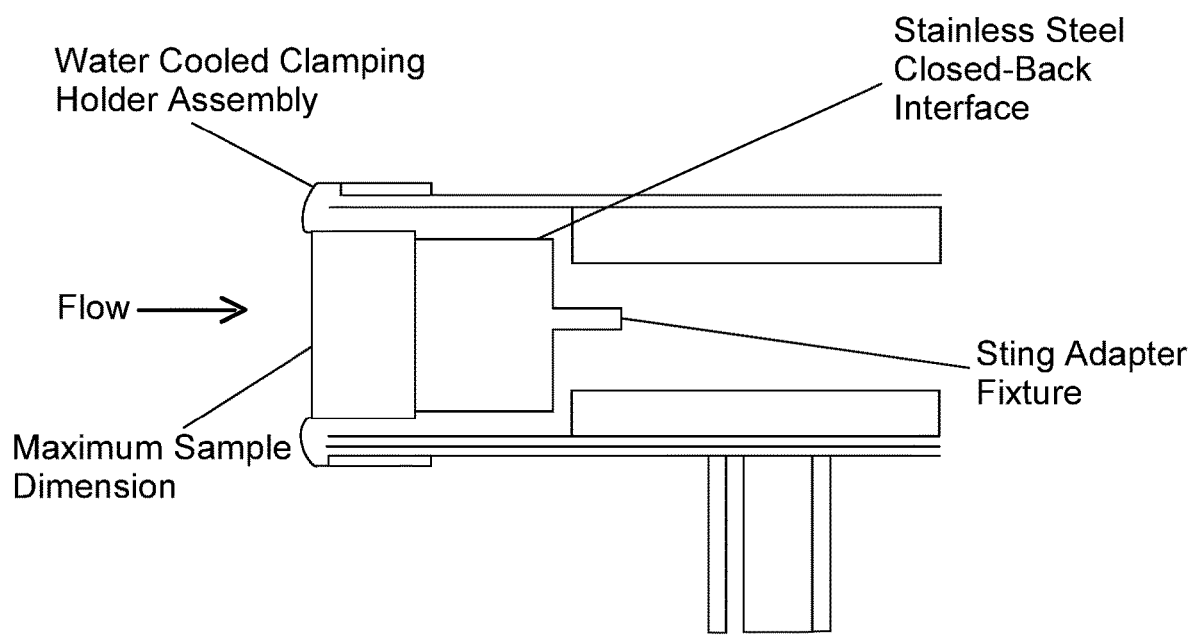
FIG. 6 illustrates an ArcJet Test configuration for sample testing.

FIG. 6 illustrates an ArcJet Test configuration, which uses a water-cooled clamping sample holder, having a diameter of about 7 cm. The tests were conducted at Johnson Space Center, using a custom-designed calibration plate, with center and off-center slug calorimeters, and which was placed in the clamping holder to set the test conditions. The heat flux was in a range 116-157 Watts/cm$^2$, the stagnation pressure was 0.16 atm, and the exposure time was 20 sec.

Laser Hardened Materials Evaluation Laboratory (LHMEL):

A LHMEL test was conducted at the Wright-Patterson Air Force Base, using a 10.6 micron $CO_2$ LHMEL laser and a 1.07 micron fiber laser. The heat flux levels and duration simulated potential Mars entry trajectories. The test conditions included a baseline level of 115 Watts/cm$^2$ for 20-30 seconds, followed by a second pulse of 30 Watts/cm$^2$ for 100 seconds.

Example 1

Preparation of silicone infiltrated samples with uniform density. The substrates (carbon felt from FMI Inc.; Durablanket; an aluminum silicate-based felt; Q-felt, pure silica felt with purity over 99.9%; PBI/PBO felt) as indicated in Table 1, having the size about 8"×8"×1", were each placed in a container under vacuum. A solution containing silicone RTV 655 (both A and B parts) dissolved in toluene was added to the container until the felts were immersed. The vacuum was maintained for about 30-180 minutes before release. The entire ensemble was placed in a 100° C. oven and heated for 24-48 hours. The gels surrounding the impregnated felts were removed, and the felts were placed on a metal rack and dried in an oven at 80-150° C. and vacuum of 1-650 Torr for 8-24 hours (until the samples were dry and without trace of solvent).

TABLE 1 processing information on silicone infiltrated ablators
(silicone resin is RTV 655 and the solvent is toluene)

| Sample ID | Substrate | Additives | Density (g/cm$^3$) | Resin content (%) |
|---|---|---|---|---|
| SIRCA | FRCI-12 | None | 0.27 | 25.9 |
| 1 | FMI carbon | None | 0.210 | 47.6 |
| 2 | Durablanket | None | 0.272 | 26.5 |
| 3 | Q-felt | None | 0.347 | 45.6 |
| 4 | PBI | None | 0.265 | 69.8 |

Example 2

X-Jet Test of silicone infiltrated samples. The samples in Table 1 were tested in X-jet to evaluate their aerothermal performance. The X-Jet provides an electrical arc between two electrodes to increase test gas enthalpy and to create a convective heating environment. The maximum nozzle size is 2.4 mm, which results in a non-uniform heating environment for samples with diameter greater than 12 mm. The heat fluxes used for this test series were in a range 111-138 Watts/cm$^2$ at a pressure of 0.116 atm, with exposure time of 20 seconds. Samples were cut into 2" by 2" squares and bonded on FRCI tile holders through RTV. The thickness of the holder was 12 mm and the backside of the holder was instrumented with a thermocouple (type K) that measures the backface temperature of the sample. For each material at each condition, only one model was tested. The test conditions and results are summarized in Table 2. SIRCA-15 was used as a control sample. The nominal density of SIRCA is 0.24 g/cm$^3$ but the actual density of SIRCA used in this test was 0.27 g/cm$^3$.

Table 2 summarizes the details of the virgin materials, test conditions as well as post-test measurements, which include recession, mass loss and backface temperature. The samples include SIRCA, carbon-silicone and PBI-silicone, which have thicknesses of 15 mm, 23 mm and 28 mm, and corresponding densities of 0.24 g/cm$^3$, 0.20 g/cm$^3$, and 0.25 g/cm$^3$, respectively. The samples were tested at heat fluxes in a range 123-133 Watt/cm$^2$ at a pressure of 0.116 atm for 20 seconds. As shown in Table 1, both mass loss and recession rank in the increasing order of SIRCA<carbon-silicone<PBI-silicone, with recession at stagnation being 0.41 mm, 1.01 mm and 1.72 mm and mass loss being 0.1 g, 0.56 g, and 1.72 g, respectively. The corresponding maximum backface temperatures are 158.7° C., 164.1° C. and 69.7° C. for SIRCA, carbon-silicone and PBI-silicone, respectively.

TABLE 2

Information on x-jet test samples, heat flux and post test measurements.

| Sample ID | Heat flux (W/cm$^2$) | Mass loss (g) | Recession (mm) | Backface temp. (° C.) |
|---|---|---|---|---|
| SIRCA | 133 | 0.41 | 0.1 | 158.7 |
| 1 | 128 | 1.01 | 0.56 | 164.1 |
| 2 | 128 | 1.02 | 0.36 | 133 |
| 3 | 118 | 0.97 | 0.13 | 227.7 |
| 4 | 123 | 1.72 | 1.42 | 69.7 |

After X-Jet testing was completed, the surface of every sample was covered with a layer of white substance, strikingly different from the black surface of the pre-test carbon-silicone and the brown surface of the PBI-silicone. The cross section of the samples shows that below the thin white surface layer is a layer of crescent-shaped black char that is not rigid.

Example 3

Flexible silicone infiltrated ablators of carbon, PBI, Durablanket and Q felt were tested, with SIRCA used as a control sample, in the laser hardened materials evaluation laboratory (LHMEL) The test conditions and sample information, as well as results are summarized in Table 3. Because the environment of LHMEL is devoid of oxygen, the LHMEL test does not provide an accurate simulation of vehicle entry condition as does ArcJet. However, LHMEL provides qualitative evaluation of how well a material withstands high temperatures, manages the heat through multiple competing processes, such as endothermic pyrolysis, re-radiation, and conduction into the material. Each composition was tested at 115 Watts/cm$^2$ heat pulse for 30 sec and the same test was repeated two times on new test specimens. The char was further tested at a lower heat flux of 30 Watts/cm$^2$ for 100 sec to mimic the two heat pulses that simulate aerocapture and landing on Mars. The averaged maximum bondline temperatures for SIRCA, Q-felt-silicone, Dura-silicone, PBI-silicone and carbon-silicone are 179° C., 628° C., 107° C., 84° C. and 89° C. respectively. The time intervals required to reach maximum bondline temperature is often an indication of how well the material insulates: the longer the time interval, the more insulative and the lower the thermal conductivity. According to Table 3, the time to reach maximum bondsline temperature for SIRCA, Q-felt-silicone, Dura-silicone, PBI-silicone and carbon-silicone are 166 sec, 38 sec, 320 sec, 326 sec and 305 sec, respectively. The ability of the char to insulate is further indicated in the maximum bondline temperature and the time to reach the maximum after the second pulse. The maximum bondline temperatures and corresponding times are 179° C., 639° C., 167° C., 99° C. and 73° C., respectively, and 180 sec, 106 sec, 297 sec, 337 sec, and 364 sec respectively. These data suggest that these new flexible ablators, especially carbon-silicone, have insulative property comparable to, or better than, SIRCA.

sured. Both density and sample thickness are listed in Table 2, from which the areal density (density×thickness) is calculated to be 0.376 g/cm$^2$, 0.538 g/cm$^2$, 0.471 g/cm$^2$ and 0.382 g/cm$^2$ for SIRCA, Refrasil-silicone, PBI-silicone and carbon-silicone respectively. Refrasil-silicone was tested at a slightly lower heat flux (126 Watts/cm$^2$) to avoid the possible melting of the silica substrate. Some trends are similar to the X-jet data discussed in the preceding: both recession and mass loss are low except for use of PBI-silicone, which has an average mass loss of 1.83 g and recession at stagnation point of 1.62 mm. As in the X-jet test,

TABLE 3

Information on LHMEL samples

| Samples | Thickness (mm) | Density (g/cm$^3$) | Areal density (g/cm$^2$) | Heat flux. (W/cm$^2$) | Time of exposure (s) | Mass loss (g) | Bondline temp. (C) | Time to max. Temp. |
|---|---|---|---|---|---|---|---|---|
| SIRCA-1 | 12.74 | 0.30 | 0.38 | 115 | 30.8 | 0.26 | 167 | 173 |
| SIRCA-2 | 12.74 | 0.29 | 0.36 | 116 | 30.1 | 0.27 | 191 | 158 |
| SIRCA-3 | 12.74 | 0.27 | 0.35 | 118 | 45.1 | 0.59 | 273 | 138 |
| Average | 12.74 | 0.29 | 0.37 | 116 | 30.5 | 0.27 | 179 | 166 |
| SIRCA-char | | | | 30 | 100 | 0.10 | 258 | 180 |
| Q-felt-1 | 4.92 | 0.29 | 0.14 | 115 | 30.1 | 0.70 | 803 | 32 |
| Q-felt-2 | 4.19 | 0.35 | 0.15 | 115 | 30.1 | 0.54 | 452 | 44 |
| Q-felt-3 | 4.65 | 0.32 | 0.15 | 115 | 20.1 | 0.43 | 287 | 147 |
| Average | 4.56 | 0.32 | 0.15 | 115 | 30.1 | 0.62 | 628 | 38 |
| Q-felt-char | | | | 31.5 | 100.1 | 0.18 | 639 | 106 |
| Dura-1 | 16.07 | 0.28 | 0.46 | 116 | 30.1 | 0.42 | 127 | 287 |
| Dura-2 | 19.42 | 0.25 | 0.48 | 117 | 30.1 | 0.41 | 89 | 393 |
| Dura-3 | 18.46 | 0.26 | 0.48 | 116 | 30.1 | 0.45 | 104 | 281 |
| Average | 17.98 | 0.26 | 0.48 | 116 | 30.1 | 0.44 | 107 | 320 |
| Dura-char | | | | 30 | 100.1 | 0.13 | 167 | 297 |
| PBI-1 | 15.60 | 0.28 | 0.43 | 118 | 30.1 | 2.01 | 85 | 307 |
| PBI-1 | 15.49 | 0.28 | 0.44 | 116 | 30.1 | 2.27 | 82 | 350 |
| PBI-1 | 16.06 | 0.26 | 0.43 | 115 | 30.1 | 2.15 | 84 | 320 |
| Average | 15.72 | 0.27 | 0.43 | 117 | 30.1 | 2.14 | 84 | 326 |
| PBI-char | | | | 28.8 | 100.1 | 0.49 | 99 | 337 |
| Carbon-1 | 21.62 | 0.19 | 0.41 | 115 | 30.1 | 0.86 | 78 | 373 |
| Carbon-2 | 19.32 | 0.20 | 0.38 | 115 | 30.1 | 1.16 | 92 | 256 |
| Carbon-3 | 18.94 | 0.21 | 0.39 | 115 | 30.1 | 0.90 | 98 | 287 |
| Average | 19.96 | 0.20 | 0.39 | 115 | 30.1 | 0.97 | 89 | 305 |
| Carbon-char | | | | 30 | 100.1 | 0.26 | 73 | 364 |

Example 4

To evaluate the ablation performance in ArcJet testing, SIRCA, carbon-silicone, Refrasil-silicone, and PBI-silicone were tested at heat fluxes in a range 126-157 Watts/cm$^2$ and a pressure of 0.16 atm for 20 sec. Table 3 summarizes sample information, heat flux and post-test measurements on mass loss, recession and backface temperature. For each material, two specimens were individually tested and measured.

PBI-silicone has the lowest backface temperature, T(back)= 63.6° C., in comparison, Refrasil-silicone and carbon-silicone have backface temperatures of 156.6° C. and 151.7° C. respectively, with SIRCA having the highest backface temperature of 190.3° C. The negative recession measured on the carbon-silicone samples is under investigation and may be due to material swelling or measurement uncertainty.

TABLE 4

Arc jet sample information and post test measurements.

| Arc jet ID | Density (g/cm$^3$) | Thickness (mm) | Heat flux (W/cm$^2$) | Mass loss (g) | Recession (mm) | Backface temp. (° C.) |
|---|---|---|---|---|---|---|
| SIRCA-01 | 0.240 | 15.68 | 157 | 0.20 | 0.71 | 191.1 |
| SIRCA_02 | | 15.68 | 157 | 0.10 | 0.61 | 189.4 |
| Refrasil-silicone_01 | 0.304 | 18.14 | 126 | 0.09 | 0.56 | 153.3 |
| Refrasil-silicone_02 | | 17.31 | 126 | 0.16 | 1.22 | 160 |
| PBI-silicone_01 | 0.265 | 19.16 | 157 | 1.9 | 1.55 | 66.1 |
| PBI-silicone_02 | | 16.77 | 157 | 1.71 | 1.68 | 61.1 |
| Carbon-silicone_01 | 0.208 | 18.58 | 157 | 0.52 | −0.20 | 151.7 |
| Carbon-silicone_02 | | 18.24 | 157 | 0.44 | −0.05 | 151.7 |

Example 5

AFRSI (Advanced flexible reusable surface insulation) felt with a thickness of 0.8-0.83 inch and density around 0.136 g/cm$^3$ was infiltrated with a solution of silicone in butanol, cured and dried according to procedures in example 1 to give sample AFRSI-silicone_01 in Table 5. A second sample AFRSI-silicone_02 was also made by infiltrating the same AFRSI felt with a higher concentration of silicone, curing and drying according to the same procedure in example 1. Arc jet tests were conducted on these two samples along with SIRCA as a control sample. The Arc jet results are summarized in Table 5: with basically similar areal density, the AFRSI-silicone samples had similar recession but much lower backface temperature, indicating superior insulating capability of AFRSI.

TABLE 5

Arc Jet data on AFRSI-silicone in comparison with SIRCA

| Sample ID | Areal Density (g/cm2) | Heat Flux (W/cm2) | Pressure (atm) | Duration (s) | Measured Recession at Center (mm) | Backface Temp (° C.) |
|---|---|---|---|---|---|---|
| SIRCA-01 | 0.54 | 115 | 0.1 | 40 | 0.64 | 220 |
| SIRCA-02 | 0.54 | 115 | 0.1 | 40 | 1.02 | 240 |
| AFRISI-silicone_01 | 0.612 | 115 | 0.1 | 40 | 1.62 | 145 |
| AFRISI-silicone_02 | 0.585 | 115 | 0.1 | 40 | −1.00 | 138 |

Example 6 two carbon-silicone samples W1 and W2 were prepared according to the sample procedures outlined in example 1 using two different types of felts, FMI and Morgan felt. These samples were subjected to Arc jet tests in JSC under two different conditions, the medium condition of 250 Watts/cm' and 0.2 atm pressure for 30 seconds as well as the high condition of 540 W/cm$^2$ and 0.35 atm for 20 seconds. Arc jet data are summarized in Table 6, which shows that under both conditions, the carbon-silicone samples had comparable recessions and lower bondline temperatures than PICA. These data prove that the flexible ablative materials are capable of heat fluxes up to 540 W/cm$^2$.

TABLE 6

Arc Jet data on carbon-silicone samples in comparison with PICA

| Sample ID | Areal Density (g/cm2) | Heat Flux (W/cm2) | Pressure (atm) | Duration (s) | Measured Recession at Center (mm) | Backface Temp (° C.) |
|---|---|---|---|---|---|---|
| PICA-01 | 0.567 | 250 | 0.2 | 30 | 5.74 | 220 |
| W1-01 | 0.346 | 250 | 0.2 | 30 | 5.20 | 240 |
| W2-01 | 0.360 | 250 | 0.2 | 30 | 5.68 | 145 |
| PICA-02 | 0.567 | 540 | 0.35 | 20 | 5.41 | 141 |
| W1-02 | 0.346 | 540 | 0.35 | 20 | 6.66 | 103 |
| W2-02 | 0.360 | 540 | 0.35 | 20 | 6.81 | 112 |

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

What is claimed is:

1. A method for producing a flexible, ablative thermal protection system (TPS) material, the method comprising:
   immersing a first side portion of a flexible, fibrous felt substrate in a phenolic resin and a first solvent mixture;
   immersing a second side portion of the flexible, fibrous felt substrate in a silicone resin and a second solvent mixture, where the first and second immersed side portions are spaced apart from each other by a portion of the substrate not immersed in the phenolic resin and not immersed in the silicone resin;
   curing the phenolic and silicone resins by at least one of application of heat and application of a catalyst; and
   removing part or all of the solvent mixtures from the substrate,
   whereby the flexible, ablative thermal protection system (TPS) material is produced, having an elastic modulus that is no more than 5000 kPa.

2. The method of claim 1, further comprising providing carbon-based or silica-based fibers in said substrate.

3. The method of claim 2, further comprising providing at least one fiber in said substrate with a fiber length in a range of $10^2$-$10^6$ μm and with a fiber diameter in a range of about 1-30 μm.

4. The method of claim 1, further comprising curing said immersed substrate in a container at an immersion temperature of 110° C. or higher for an immersion time interval of 24 hours or higher, to thereby provide the cured thermal protection system (TPS) material.

5. The method of claim 1, further comprising choosing said substrate from at least one of a carbon felt, a ceramic felt, a silica felt, a ceramic/silica felt, a silica/alumina felt, and a polymer felt.

6. The method of claim 1, where said first solvent mixture comprises at least one of ethylene glycol and alcohol.

7. The method of claim 1, where said second solvent mixture comprises at least one of toluene and butanol.

8. The method of claim 1, wherein the flexible, fibrous felt substrate has a thickness in the range 1 cm to 8 cm.

9. The method of claim 1, wherein the thermal protection material has a density of about 0.20 to 0.35 g/cm$^3$.

* * * * *